United States Patent
Kondo et al.

(10) Patent No.: US 7,171,039 B2
(45) Date of Patent: Jan. 30, 2007

(54) DEFECT CLASSIFICATION/INSPECTION SYSTEM

(75) Inventors: Hiroshi Kondo, Kanagawa (JP); Masatsugu Okuyama, Kanagawa (JP); Yo Saito, Kanagawa (JP)

(73) Assignee: Sony Precision Technology Inc., Tokyo (JP)

( * ) Notice: Subject to any disclaimer, the term of this patent is extended or adjusted under 35 U.S.C. 154(b) by 733 days.

(21) Appl. No.: 10/222,431

(22) Filed: Aug. 16, 2002

(65) Prior Publication Data

US 2003/0152276 A1  Aug. 14, 2003

(30) Foreign Application Priority Data

Feb. 8, 2002   (JP) .............................. 2002-032910

(51) Int. Cl.
G06K 9/00 (2006.01)
G06K 9/70 (2006.01)
G06K 9/60 (2006.01)

(52) U.S. Cl. ........................ 382/149; 382/227; 382/305

(58) Field of Classification Search ................ 382/149, 382/227, 305

See application file for complete search history.

(56) References Cited

U.S. PATENT DOCUMENTS

| | | | | |
|---|---|---|---|---|
| 4,519,041 A | * | 5/1985 | Fant et al. | 382/141 |
| 4,748,678 A | * | 5/1988 | Takeda et al. | 382/306 |
| 5,226,118 A | * | 7/1993 | Baker et al. | 715/833 |
| 5,544,256 A | * | 8/1996 | Brecher et al. | 382/149 |
| 6,092,059 A | * | 7/2000 | Straforini et al. | 706/14 |
| 6,148,099 A | * | 11/2000 | Lee et al. | 382/149 |
| 6,292,582 B1 | * | 9/2001 | Lin et al. | 382/149 |
| 6,535,776 B1 | * | 3/2003 | Tobin et al. | 700/110 |
| 6,751,343 B1 | * | 6/2004 | Ferrell et al. | 382/145 |
| 6,847,972 B1 | * | 1/2005 | Vernau et al. | 707/101 |
| 2003/0061243 A1 | * | 3/2003 | Kim et al. | 707/200 |

OTHER PUBLICATIONS

Kauppinen, H., Rautio, H. and Silven, O., "Non-Segmenting Defect Detection and SOM Based Classification for Surface Inspection Using Color Vision", Conf. on Polorization and Color Techniques in Industrial Inspection, Jun. 1999, pp. 270-280.*

* cited by examiner

Primary Examiner—Bhavesh M. Mehta
Assistant Examiner—Utpal Shah
(74) Attorney, Agent, or Firm—Haverstock & Owens LLP

(57) ABSTRACT

An image of an inspection object is picked up by an image pickup unit, and a characteristics quantity of an image of a defect part extracted by a defect extracting unit is extracted and digitized by a characteristics extracting unit. A database preparing unit regroups defects having similar characteristics by a defect classification unit on the basis of the characteristics information digitized by the characteristics extracting unit with respect to defects belonging to a defect group selected and designated by an operator via a display/input unit, and prepares on a database memory a database in which the defects of the inspection object are hierarchically classified. A classification executing unit hierarchically classifies the defects of the inspection object with reference to the database provided by the database preparing unit on the basis of the digitized characteristics information extracted by the characteristics extracting unit from the image of the defect part of the inspection object extracted by the defect extracting unit. Thus, a defect classification/inspection system having high classification accuracy is provided.

6 Claims, 5 Drawing Sheets

DEFECT CLASSIFICATION/INSPECTION SYSTEM

BACKGROUND OF THE INVENTION

1. Field of the Invention

This invention relates to a defect classification/inspection system for classifying and inspecting a defect of a semiconductor wafer or the like.

2. Description of the Related Art

A semiconductor device is prepared by forming a fine device pattern on a semiconductor wafer. In forming such a device pattern, a dust particle might stick to the surface of the semiconductor wafer or the semiconductor wafer might be scratched, thus causing a defect thereon. The semiconductor device having such a defect generated thereon is a defective device, which lowers the yield.

Therefore, in order to stabilize the yield on the manufacturing line at a high standard, it is preferred to early find a defect generated by a dust particle or scratch, specify the cause of the defect, and take effective measures for the manufacturing equipment and the manufacturing process.

If a defect is found, a defect inspection system is used to inspect and classify the defect and to specify the equipment and process which caused the defect. The defect inspection system identifies the defect by magnifying it, like an optical microscope.

According to a widely used technique for automatic classification of defects of the semiconductor wafers, a defect is located by comparing the image of a defect with a reference image and then the characteristics of the located defect is further compared with a database for classification.

FIG. 1 shows a process of preparing a defect classification database in a conventional defect classification/inspection system.

In the process of preparing the defect classification database, a defect image and a reference image which are picked up by an image pickup unit 201 are saved in a defect image memory 202 and a reference image memory 203, respectively. Of these images, only the images of the defective part are extracted by a defect extracting unit 204 and the characteristics quantity of the size, color and the like of the defect is digitized as defect information by a characteristics extracting unit 205. The digitized defect information is temporarily stored in a pre-classification data memory 206 and is then classified by the operator. The operator classifies each defect from his/her experience and provides a classification code to each group after the classification. The characteristics information of the respective groups having the classification codes provided thereto is saved in a classification result memory 212 as information of classes 1 to N. Characteristics information obtained at a data selecting unit 213 by eliminating redundancy from the information of the classes 1 to N saved in the classification result memory 212 is saved in a database memory 218 as a database.

FIG. 2 shows a process of executing classification in the conventional defect classification/inspection system.

In the process of executing classification, similarly to the process of preparing the database, a defect image and a reference image which are picked up by the image pickup unit 201 are saved in the defect image memory 202 and the reference image memory 203, respectively. Of these images, only the images of the defective part are extracted by the defect extracting unit 204 and the characteristics quantity of the size, color and the like of the defect is digitized as defect information by the characteristics extracting unit 205. After that, at a comparison/classification code providing unit 219, the defect information is compared with characteristics information of the classes 1 to N contained in the database saved in the database memory 218 and is provided with the code of the class having the coincident characteristics. Thus, the classification result is outputted from a classification result output unit 220.

In order to improve the manufacturing equipment and the manufacturing processes on the basis of defects thus found, it is desired to inspect defects on many semiconductor wafers and identify the precise causes of the defects. However, with the design rules for semiconductor wafers growing ever smaller, various types of defects are generated, requiring much more time and labor for carrying out accurate classification.

When the difference in defect characteristics between the defect groups contained in the database is small, the chance of faulty classification increases. In the conventional database preparation process, the operator determines and classifies defects from his/her experience, as shown in FIG. 1. Therefore, the classification requires skills and it is difficult to eliminate the similarity in defect characteristics between the classification groups contained in the database.

In the classification execution process, since all the defects are classified on a single level, the classification accuracy is lowered and classification errors easily occur.

SUMMARY OF THE INVENTION

It is an object of the present invention to provide a defect classification/inspection system with high classification accuracy.

According to the present invention, by reducing the operator's participation in the database preparation, a database containing defect groups reduced with similarity in defect characteristics can be easily constructed, and in the classification execution process, defects are classified on a plurality of hierarchical levels.

A defect classification/inspection system according to the present invention comprises: a defect extracting unit for picking up an image of an inspection object and comparing the image with a reference image having no defect, thereby extracting an image of a defect part; a characteristics extracting unit for extracting and digitizing the characteristics quantity of the image of the defect part extracted by the defect extracting unit; a database preparing unit including defect classifying means for grouping defects having similar characteristics on the basis of the characteristics information digitized by the characteristics extracting unit, classification code providing means for providing a classification code to the defects grouped by the defect classifying means, storage means for saving the characteristics information of the defects grouped by the defect classifying means together with the classification code provided by the classification code providing means as a database, and selecting/designating means for selecting and designating a defect group for which a database of a next hierarchical level is to be prepared, from the respective defect groups having the grouped defects and having the classification code provided thereto, the database preparing unit regrouping defects having similar characteristics by the defect classifying means on the basis of the characteristics information digitized by the characteristics extracting means with respect to the defects belonging to the defect group selected and designated by the selecting/designating means, and preparing a database in which the defects of the inspection object are hierarchically classified; and a classification executing unit for hierarchically classifying the defects of the inspection object with reference to the database provided by the database preparing unit on the basis of the digitized characteristics information extracted by the characteristics extracting unit from the image of the defect part of the inspection object extracted by the defect extracting unit.

In the defect classification/inspection system according to the present invention, defects having similar characteristics are regrouped by the defect classifying means on the basis of the characteristics information digitized by the characteristics extracting means with respect to the defects belonging to the defect group selected and designated by the selecting/designating means, and a database can be prepared in which the defects of the inspection object are hierarchically classified. Moreover, in the defect classification/inspection system according to the present invention, since the defects having similar characteristics are grouped by the defect classifying means on the basis of the characteristics information digitized by the characteristics extracting unit, the operator can easily prepare a database simply by determining whether or not the defect group only consists of single defects and providing an identification code thereto. By creating the database so it is organized in a plurality of hierarchical levels, it is possible to eliminate the similarity between the classification groups.

Since the classification executing unit hierarchically classifies the defects of the inspection object with reference to the hierarchical database provided by the database preparing unit on the basis of the digitized characteristics information extracted by the characteristics extracting unit from the image of the defect part of the inspection object extracted by the defect extracting unit, it is possible to classify the defects with higher accuracy than in the case of deciding the entire classification on a single level.

DESCRIPTION OF THE PREFERRED EMBODIMENT

A preferred embodiment of the present invention will now be described in detail with reference to the drawings.

Figure 1:
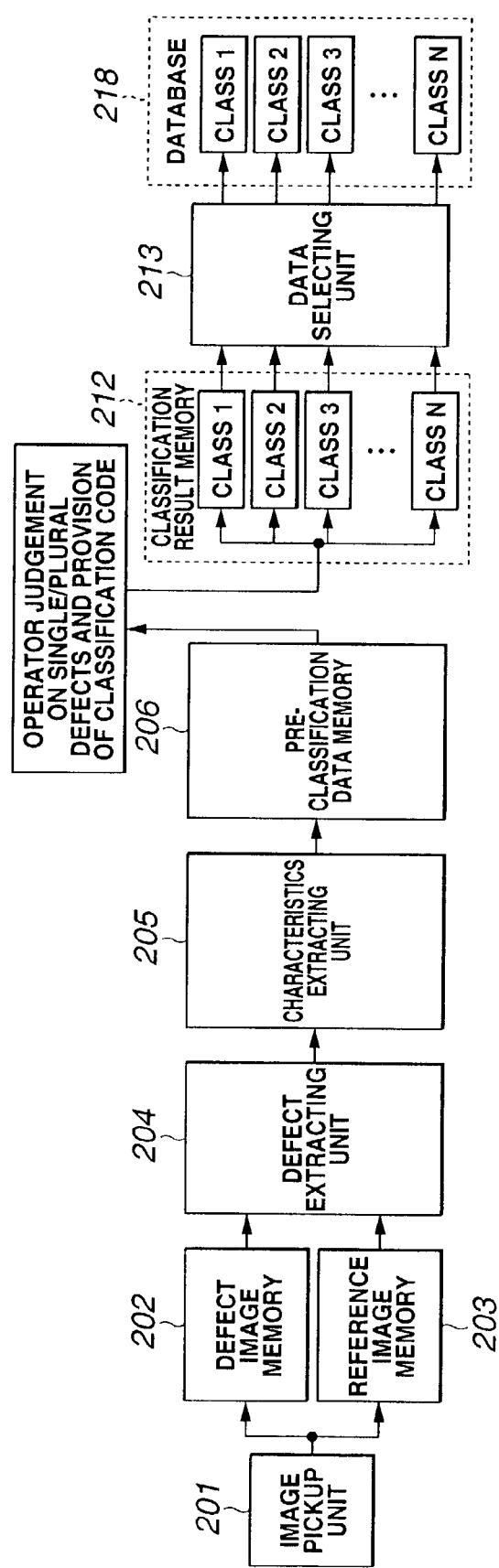
FIG. 1 shows a process of preparing a defect classification database in a conventional defect classification/inspection system.
Figure 2:
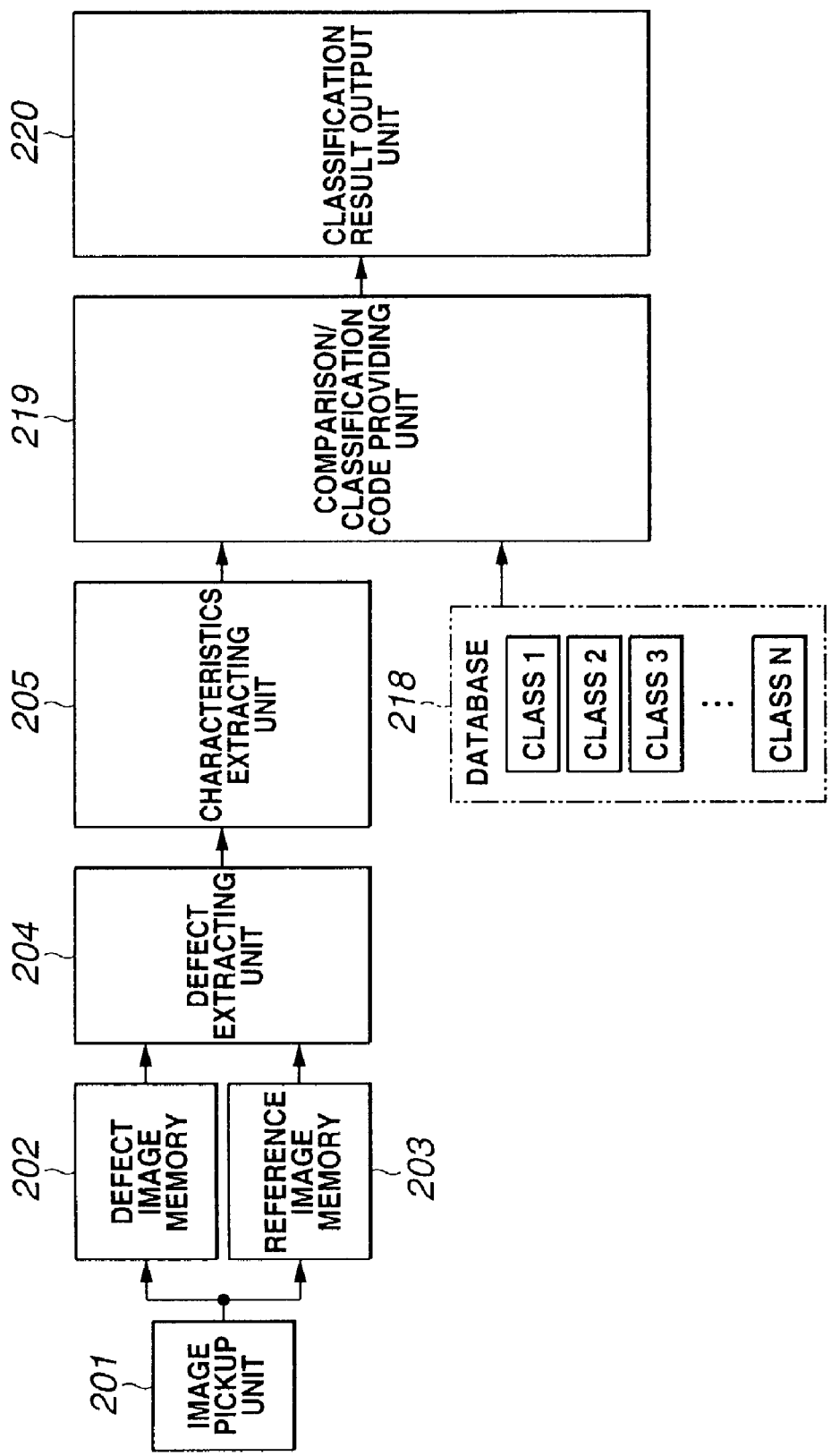
FIG. 2 shows a process of executing classification in the conventional defect classification/inspection system.
Figure 3:
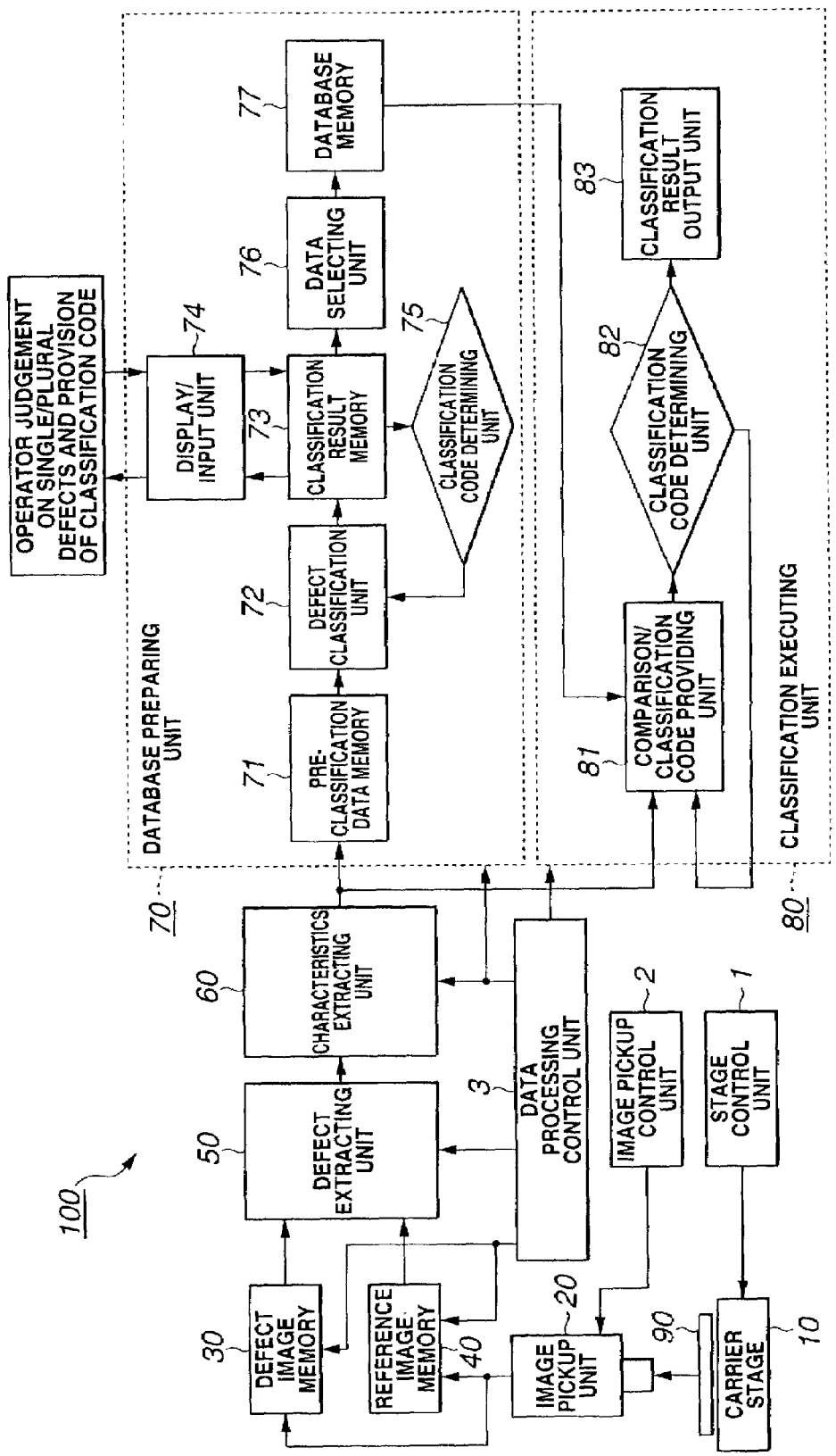
FIG. 3 is a block diagram showing the structure of a defect classification/inspection system according to the present invention.

This invention is applied to, for example, a defect classification/inspection system 100 as shown in FIG. 3.

This defect classification/inspection system 100 is adapted for classifying and inspecting a defect on a semiconductor wafer 90 set on a carrier stage 10 as an inspection object. The defect classification/inspection system 100 is constituted by the carrier stage 10 controlled by a stage control unit 1, an image pickup unit 20 controlled by an image pickup control unit 2, and a defect image memory 30, a reference image memory 40, a defect extracting unit 50, a characteristics extracting unit 60, a database preparing unit 70 and a classification executing unit 80 which are controlled by a data processing control unit 3.

In this defect classification/inspection system 100, the carrier stage 10 is controlled by the stage control unit 1 and positions the semiconductor wafer 90 set thereon at a coordinate position designated by the stage control unit 1.

The image pickup unit 20 is adapted for picking up an image of the inspection object. The image pickup unit 20 is controlled by the image pickup control unit 2, has its focus, brightness and the like adjusted, and picks up an image of the surface of the inspection object on the carrier stage 10, that is, the semiconductor wafer 90. An image pickup output of this image pickup unit 20 is supplied as an image file to the defect image memory 30 or the reference image memory 40.

The defect image memory 30 is adapted for saving a defect image containing an image of a defect part obtained as the image pickup output of the image pickup unit 20. Writing/reading of image data to/from the defect image memory 30 is controlled by the data processing control unit 3. Defect image data obtained as the image pickup output of the image pickup unit 20 is written into the defect image memory 30 and the defect image data is read out therefrom.

The reference image memory 40 is adapted for saving a reference image having no defect which is compared with the defect image. Writing/reading of image data to/from the reference image memory 40 is controlled by the data processing control unit 3. Reference image data of a similar pattern with no defect, obtained as the image pickup output of the image pickup unit 20, is written into the reference image memory 40 and the reference image data is read out therefrom.

When preparing a database and executing defect classification, defect image data containing an image of the defect part obtained by picking up an image of the surface of the semiconductor wafer 90 by the image pickup unit 20, in the state where the carrier stage 10 is controlled by the stage control unit 1 on the basis of coordinate position data of a defect detected in defect inspection on the manufacturing line of the semiconductor wafer 90 and the semiconductor wafer 90 on the carrier stage 10 is positioned at the coordinate position of the defect, is written into the defect image memory 30, and an image obtained by picking up an image of the surface of the semiconductor wafer 90 by the image pickup unit 20, in the state where the semiconductor wafer 90 is positioned at the same position on a similar pattern with no defect, is written as reference image data into the reference image memory 40.

The defect extracting unit 50 is adapted for comparing an inspection object image obtained by picking up an image of the inspection object with a reference image having no defect, thereby extracting an image of a defect part. The defect extracting unit 50 compares the defect image data saved in the defect image memory 30 with the reference image data saved in the reference image memory 40, thereby extracting the difference between the defect image as the image of the defect part and the reference image of the semiconductor wafer 90 picked up by the image pickup unit 20. The image of the defect part extracted by the defect extracting unit 50 is supplied to the characteristics extracting unit 60.

The characteristics extracting unit 60 extracts information such as size, color, contrast and shape of the image of the defect part extracted by the defect extracting unit 50, and digitizes the information as a characteristics quantity.

The characteristics information such as size, color, contrast and shape, digitized by the characteristics extracting unit 60, is supplied to the database preparing unit 70 when preparing a database, and is supplied to the classification executing unit 80 when executing defect classification.

The database preparing unit 70 is constituted by the following units: a pre-classification data memory 71 for saving the characteristics information supplied from the characteristics extracting unit 60; a defect classification unit 72 for automatically grouping defects having similar characteristics on the basis of the digitized characteristics information saved in the pre-classification data memory 71; a classification result memory 73 for saving respective defect groups obtained as the result of the classification by the defect classification unit 72; a display and input unit 74 for displaying the respective defect groups saved in the classification result memory 73, accepting an input of a classification code from the operator, and accepting an input of selection and designation of a defect group; a classification code determining unit 75 for determining a classification code for the defect group selected and designated by the operator via the display/input unit 74 from the respective defect groups saved in the classification result memory 73, and causing the defect classification unit 72 to regroup defects having similar characteristics on the basis of the digitized characteristics information with respect to the defects belonging to the defect group thus selected and designated; a data selecting unit 76 for selecting the characteristics information of the respective defect groups saved in the classification result memory 73 and the classification codes provided thereto; and a database memory 77 for saving, as a database, the characteristics information of the respective defect groups and the classification codes provided thereto, selected by the data selecting unit 76. In this database preparing unit 70, with respect to the defects belonging to the defect group selected and designated by the operator via the display/input unit 74, the defect classification unit 72 is caused to regroup defects having similar characteristics on the basis of the characteristics information digitized by the characteristics extracting unit 60, and a database in which the defect of the inspection object are hierarchically classified is prepared on the database memory 77.

The classification executing unit 80 is constituted by the following units: a comparison/classification code providing unit 81 for comparing the characteristics information extracted and digitized by the characteristics extracting unit 60 with the database provided by the database preparing unit 70, and providing a classification code in accordance with the database; a classification code determining unit 82 for determining whether or not the processing on the next hierarchical level is needed for the classification code provided by the comparison/classification code providing unit 81; and a classification result output unit 83 for outputting the classification code provided by the comparison/classification code providing unit 81. The classification executing unit 80 hierarchically classifies the defects of the semiconductor wafer 90 with reference to the database provided by the database preparing unit 70 on the basis of the characteristics information extracted and digitized by the characteristics extracting unit 60 from the image of the defect part of the inspection object, that is, the semiconductor wafer 90, extracted by the defect extracting unit 50.

In the defect classification/inspection system 100 of the above-described structure, the database is prepared in the following manner so as to execute defect classification.

Specifically, in the database preparation process, defect image data containing an image of a defect part obtained by picking up an image of the surface of the semiconductor wafer 90 by the image pickup unit 20, in the state where the carrier stage 10 is controlled by the stage control unit 1 on the basis of coordinate position data of a defect detected in defect inspection on the manufacturing line of the semiconductor wafer 90 and the semiconductor wafer 90 on the carrier stage 10 is positioned at the coordinate position of the defect, is written into the defect image memory 30, and an image obtained by picking up an image of the surface of the semiconductor wafer 90 by the image pickup unit 20, in the state where the semiconductor wafer 90 is positioned at the same position on a similar pattern with no defect, is written as reference image data into the reference image memory 40.

Next, the defect extracting unit 50 compares the defect image data saved in the defect image memory 30 with the reference image data saved in the reference image memory 40, thereby extracting the difference between the defect image as the image of the defect part and the reference image of the semiconductor wafer 90 picked up by the image pickup unit 20. The characteristics extracting unit 60 extracts information such as size, color, contrast and shape of the image of the defect part extracted by the defect extracting unit 50, and digitizes the information as a characteristics quantity. For example, the area itself is saved as the size and the brightness of primary colors is saved as the color. The ratio of a maximum value to a minimum value of the luminance within the defect image is saved as the contrast. As the shape, the type of the most similar shape model and its component ratio, for example, a diameter ratio in the case of an ellipse or the ratio of two sides in the case of a rectangle, are saved.

The database preparing unit 70 stores the digitized characteristics information obtained from the characteristics extracting unit 60 into the pre-classification data memory 71, then causes the defect classification unit 72 to automatically group defects having similar characteristics on the basis of the digitized characteristics information, and saves respective defect groups obtained as the result of the classification by the defect classification unit 72 into the classification result memory 73.

The automatic classification at the defect classification unit 72 is carried out, for example, in accordance with the following procedure.

The number of groups into which the characteristics are to be classified is set in advance as a parameter. After all the defects are classified into, for example, three groups by size, each group is further divided on the basis of the shape model and its component ratio. By sequentially applying the respective characteristics as described above, the group is subdivided in accordance with the difference in the numerical value.

The operator confirms the result of the classification by the defect classification unit 72 via the display/input unit 74. The operator determines whether the group only consists of single defects or plural defects are mixed in the group and also determines the type of the defect. The operator then provides the respective defect groups with classification codes which enable identification of the respective defect groups, via the display/input unit 74. The redundancy of the defect information of the respective defect groups provided with the classification codes is eliminated by the data selecting unit 76 and the resulting defect information is then saved into the database memory 77 together with the classification codes.

Of the defect groups saved in the classification result memory 73, a group in which a plurality of defects are mixed is selected and designated by the operator via the display/input unit 74. Then, as the classification codes of the respective defect groups are determined by the classification code determining unit 75, characteristics information of defects belonging to the defect group in which a plurality of defects are mixed is identified. With respect to the defects belonging to the defect group in which the plurality of defects are mixed, defects having similar characteristics are regrouped by the defect classification unit 72 on the basis of the characteristics information digitized by the characteristics extracting unit 60 and classification codes are provided to the resulting groups. The operator confirms the presence of the mixed group again and repeats the classification processing until no mixed group exists. Every time the operator carries out the classification processing, the operator prepares a database for that hierarchical level.

In the classification execution process, first, defect image data containing an image of a defect part obtained by picking up an image of the surface of the semiconductor wafer 90 by the image pickup unit 20, in the state where the carrier stage 10 is controlled by the stage control unit 1 on the basis of coordinate position data of a defect detected in defect inspection on the manufacturing line of the semiconductor wafer 90 and the semiconductor wafer 90 on the carrier stage 10 is positioned at the coordinate position of the defect, is written into the defect image memory 30, and an image obtained by picking up an image of the surface of the semiconductor wafer 90 by the image pickup unit 20, in the state where the semiconductor wafer 90 is positioned at the same position on a similar pattern with no defect, is written as reference image data into the reference image memory 40.

Next, the defect extracting unit 50 compares the defect image data saved in the defect image memory 30 with the reference image data saved in the reference image memory 40, thereby extracting the difference between the defect image as the image of the defect part and the reference image of the semiconductor wafer 90 picked up by the image pickup unit 20. The characteristics extracting unit 60 extracts information such as size, color, contrast and shape of the image of the defect part extracted by the defect extracting unit 50, and digitizes the information as a characteristics quantity.

In the classification executing unit 80, the comparison/classification code providing unit 81 compares the digitized characteristics information obtained from the characteristics extracting unit 60 with the database provided by the database preparing unit 70, and provides a classification code in accordance with the database. The classification code determining unit 82 determines whether the classification code provided by the comparison/classification code providing unit 81 requires another comparison on the next hierarchical level or not. If the classification code requires another comparison on the next hierarchical level, the comparison/classification code providing unit 81 carries out comparison on the next hierarchical level and provides a classification code. At the comparison/classification code providing unit 81, the defect provided with the classification code which requires another comparison is again compared with a database on the next hierarchical level provided by the database preparing unit 70 and is provided with a classification code. The classification processing is repeated until a classification code which requires no more comparison is provided by the comparison/classification code providing unit 81. The defect which is provided with the classification code requiring no more classification and has its class decided is sent to the classification result output unit 83 each time.

Figure 4:
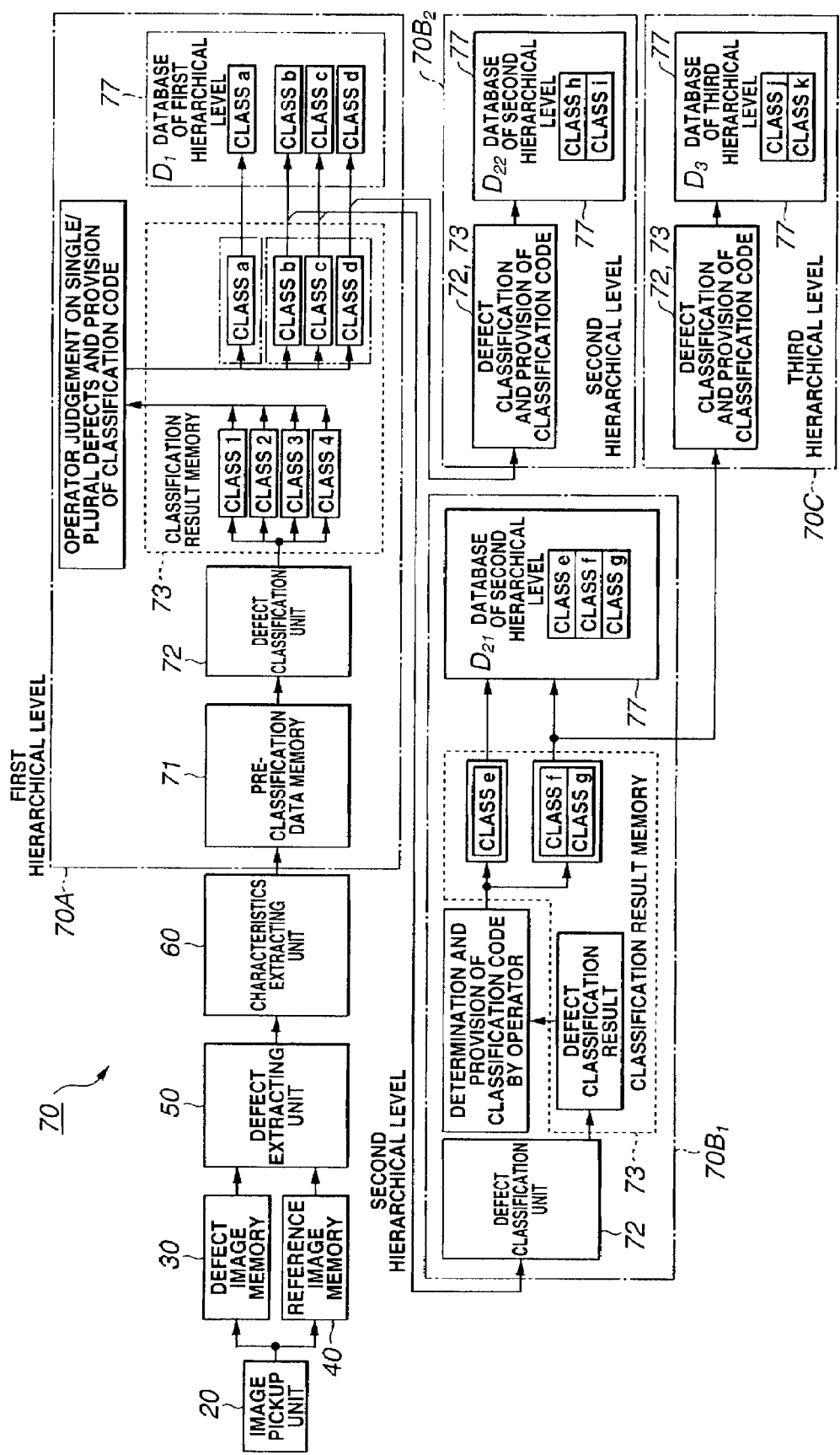
FIG. 4 shows an example of execution of database preparation processing in the defect classification/inspection system.

FIG. 4 shows an example of execution of the database preparation processing in the defect classification/inspection system 100 of the above-described structure. In the example of execution shown in FIG. 4, the following procedure is decided and executed by the data processing control unit 3.

Image files of a defect image and a reference image picked up by the image pickup unit 20 are taken in the defect image memory 30 and the reference image memory 40, respectively. A differential image between the defect image and the referenced image is extracted by the defect extracting unit 50 as defect information. Of the extracted defect information, information such as size, color, contrast and shape is digitized by the characteristics extracting unit 60 as characteristics information of the defect image.

The database preparing unit 70 first executes a database preparation process 70A on the first hierarchical level.

In the database preparation process 70A on the first hierarchical level, the characteristics information of the defect image is temporarily stored in the pre-classification data memory 71 and then automatically classified into a plurality of groups having similar characteristics by the defect classification unit 72. The groups are saved as "class 1" to "class 4" in the classification result memory 73. Then, by the operator, a class a is allocated as a group only consisting of single defects and classes b, c, d are allocated as groups in which defects are mixed. At this point, since automatic classification has already been done and the operator is not required to perform classification based on self-determination, determination and provision of the classification code can be carried out relatively easily. The redundancy of the defect information of the classes a to d provided with the classification codes is eliminated and the characteristics information of the respective classes a to d together with the classification codes is saved into the database memory 77 as a database D1 of the first hierarchical level.

With respect to the classes b and c of the groups having mixed defects, a first database preparation process 70B1 on the second hierarchical level is executed. Moreover, with respect to the class d, a second database preparation process 70B2 on the second hierarchical level is executed.

In the first database preparation process 70B1 on the second hierarchical level, similarly to the database preparation process 70A on the first hierarchical level, the defect information is automatically classified by the defect classification unit 72 and the result of the classification is saved into the classification result memory 73. After a class e is allocated to a single-defect group and classes f and g are allocated to mixed-defect groups by the operator, the characteristics information of the classes e to g together with the classification codes is saved into the database memory 77 as a first database D21 of the second hierarchical level.

Moreover, with respect to the classes f and g of the mixed-defect groups, a database preparation process 70C on the third hierarchical level is executed.

In the second database preparation process 70B2 on the second hierarchical level, similarly to the database preparation process 70A on the first hierarchical level, the defect information is automatically classified by the defect classification unit 72 and the result of the classification is saved into the classification result memory 73. The operator allocates classes h and i to single-defect groups and recognizes from the provided classification codes that these groups need not be sent to the next hierarchical level. The characteristics information of the classes h and i together with the classification codes is saved as a database D22 of the second hierarchical level and the process ends.

As for the flow of the defect information in the database preparation process 70C on the third hierarchical level, similar to the second database preparation process 70B2 on the second hierarchical level, after the automatic classification and the provision of the classification codes, the operator allocates classes j and k and recognizes from the provided classification codes that these groups need not be sent to the next hierarchical level. The classes j and k are saved in the database memory 77 as a database D3 of the third hierarchical level and the process ends.

According to the above-described database preparation process, classification is made easier by hierarchically preparing the database. That is, since only the classes having outstanding characteristics can be sequentially decided, it is easier to eliminate the similarity between classification groups than in the case of carrying out the entire classification based on a database on a single level.

Figure 5:
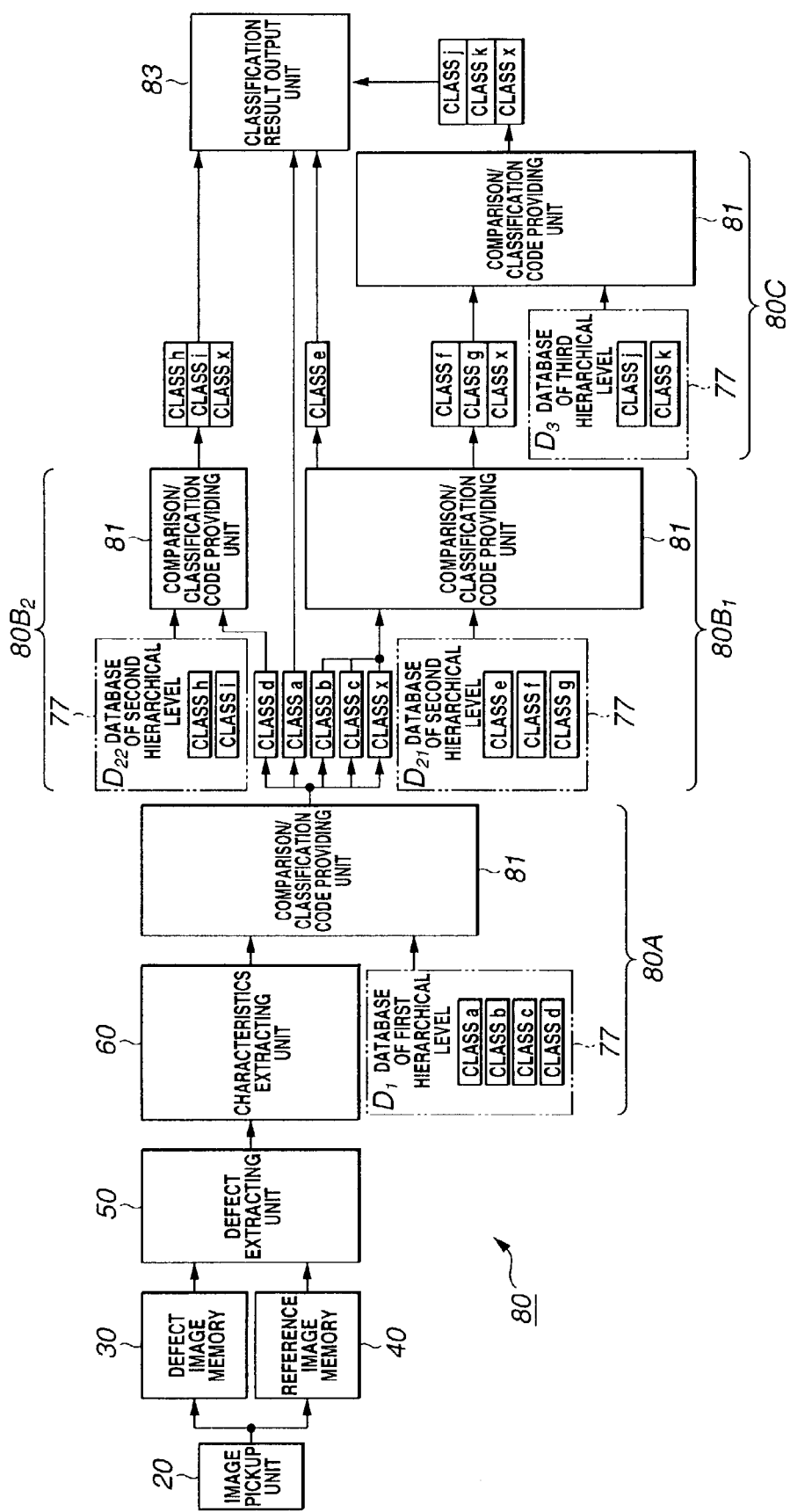
FIG. 5 shows an example of execution of automatic classification based on a hierarchical database prepared by the data preparation processing in the defect classification/inspection system.

FIG. 5 shows an example of execution of automatic classification based on the hierarchical database thus prepared. In the example of execution shown in FIG. 5, the following procedure is decided and executed by the data processing control unit 3.

Image files of a defect image and a reference image picked up by the image pickup unit 20 are taken in the defect image memory 30 and the reference image memory 40, respectively. A differential image between the defect image and the referenced image is extracted by the defect extracting unit 50 as defect information. Of the extracted defect information, information such as size, color, contrast and shape is digitized by the characteristics extracting unit 60 as characteristics information of the defect image.

The classification executing unit 80 executes a classification execution process 80A on the first hierarchical level.

In the classification execution process 80A on the first hierarchical level, the characteristics information of the defect image digitized by the characteristics extracting unit 60 is compared with characteristics information of classes a to d contained in a database D1 of the first hierarchical level and the code of the class having the coincident characteristics is provided thereto by the comparison/classification code providing unit 81. In this example, if the classification code provided in the classification execution process 80A on the first hierarchical level is the class a, the classification code is determined as such and sent to the classification result output unit 83, ending the classification process.

If the classification code provided in the classification execution process 80A on the first hierarchical level is the class b or c, or a class x which indicates an indefinite class, a first classification execution process 80B1 on the second hierarchical level is executed with respect to the defect.

In the first classification execution process 80B1 on the second hierarchical level, with respect to the defect provided with the classification code which is the class b or c, or the class x indicating an indefinite class, as a result of the classification execution process 80A on the first hierarchical level, the characteristics information of the defect image is compared with characteristics information of classes e, f and g contained in a first database D21 of the second hierarchical level and the code of the class having the coincident characteristics is provided thereto by the comparison/classification code providing unit 81. In this example, if the classification code provided in the first classification execution process 80B1 on the second hierarchical level is the class e, the classification code is determined as such and sent to the classification result output unit 83, ending the classification process.

If the classification code provided in the first classification execution process 80B1 on the second hierarchical level is the class f or g, or a class x which indicates an indefinite class, a classification execution process 80C on the third hierarchical level is executed with respect to the defect.

In the classification execution process 80C on the third hierarchical level, with respect to the defect provided with the classification code which is the class f or g, or the class x indicating an indefinite class, as a result of the first classification execution process 80B1 on the second hierarchical level, the characteristics information of the defect image is compared with characteristics information of classes j and k contained in a database D3 of the third hierarchical level and the code of the class having the coincident characteristics is provided thereto by the comparison/classification code providing unit 81. In this example, the classification code, which is the class j, k or the indefinite class x, provided in the classification execution process 80C on the third hierarchical level is determined as such and sent to the classification result output unit 83, ending the classification process.

Meanwhile, if the classification code provided in the classification execution process 80A on the first hierarchical level is the class d, a second classification execution process 80B2 on the second hierarchical level is executed with respect to the defect.

Om the second classification execution process 80B2 on the second hierarchical level, with respect to the defect provided with the classification code of the class d in the classification execution process 80A on the first hierarchical level, the characteristics information of the defect image is compared with characteristics information of classes h and i contained in a second database D22 of the second hierarchical level and the code of the class having the coincident characteristics is provided thereto by the comparison/classification code providing unit 81. In this example, the classification code, which is the class h, i or the indefinite class x, provided in the classification execution process 80C on the third hierarchical level is determined as such and sent to the classification result output unit 83, ending the classification process.

According to the above-described automatic classification process, the characteristics are compared with a different database of each hierarchical level and classification codes are determined sequentially from the class having outstanding characteristics, thus enabling highly accurate classification.

In the above-described defect classification/inspection system, the defect extracting unit 50 compares defect image data saved in the defect image memory 30 with reference image data saved in the reference image memory 40, thereby extracting the difference between a defect image as an image of a defect part and a reference image of the semiconductor wafer 90 picked up by the image pickup unit 20. However, the storage area on the image memory may be divided to save the reference image data and the defect image data. In the case of an inspection object having a repetitive pattern formed thereon, a part of an image of the repetitive pattern obtained by picking up an image of the inspection object may be used as a reference image, and an image of a defect part may be extracted on the basis of a change of the image of the repetitive pattern.

What is claimed is:

1. A defect classification/inspection system comprising:
a defect extracting unit for picking up an image of an inspection object and comparing the image with a reference image having no defect, thereby extracting an image of a defect part;
a characteristics extracting unit for extracting and digitizing the characteristics quantity of the image of the defect part extracted by the defect extracting unit;
a database preparing unit including defect classifying means for grouping defects having similar characteristics on the basis of the characteristics information digitized by the characteristics extracting unit, classification code providing means for providing a classification code to the defects grouped by the defect classifying means, storage means for saving the characteristics information of the defects grouped by the defect classifying means together with the classification code provided by the classification code providing means as a database, and selecting/designating means for selecting and designating groups having mixed defects for which a database of a next hierarchical level is to be prepared, from the respective defect groups having the grouped defects and having the classification code provided thereto, the database preparing unit regrouping defects having similar characteristics by the defect classifying means on the basis of the characteristics information digitized by the characteristics extracting means with respect to the defects belonging to the mixed defect groups selected and designated by the selecting/designating means, and preparing a database in which the defects of the inspection object are hierarchically classified; and
a classification executing unit for hierarchically classifying the defects of the inspection object with reference to the database provided by the database preparing unit on the basis of the digitized characteristics information extracted by the characteristics extracting unit from the image of the defect part of the inspection object extracted by the defect extracting unit, wherein the classification executing unit includes a classification code determining unit for determining whether additional processing is needed based on the classification code.

2. The defect classification/inspection system as claimed in claim 1, wherein the defect extracting unit extracts the image of the defect part on the basis of a change of a repetitive pattern of the image obtained by picking up the image of the inspection object.

3. The defect classification/inspection system as claimed in claim 1, wherein the classification executing unit compares the digitized characteristics information extracted by the characteristics extracting unit with the database provided by the database preparing unit and provides a classification code, thereby hierarchically classifying the defect of the inspection object.

4. The defect classification/inspection system as claimed in claim 1, further comprising a display/input unit wherein the classification code is confirmed by an operator.

5. The defect classification/inspection system as claimed in claim 1, wherein the database in which the defects of the inspection object are hierarchically classified further comprises one or more databases for each hierarchical level.

6. The defect classification/inspection system as claimed in claim 1, wherein the defects are grouped in a predetermined number of groups.

* * * * *

UNITED STATES PATENT AND TRADEMARK OFFICE
CERTIFICATE OF CORRECTION

| | |
|---|---|
| PATENT NO. | : 7,171,039 B2 |
| APPLICATION NO. | : 10/222431 |
| DATED | : January 30, 2007 |
| INVENTOR(S) | : Hiroshi Kondo, Masatsuga Okuyama and Yo Saito |

It is certified that error appears in the above-identified patent and that said Letters Patent is hereby corrected as shown below:

On the Title Page

Item 73, Assignee, please replace "Sony Precision Technology Inc." with --Sony Manufacturing Systems Corporation --.

Signed and Sealed this

Fourth Day of December, 2007

JON W. DUDAS
*Director of the United States Patent and Trademark Office*